(12) United States Patent
Wang

(10) Patent No.: US 7,830,038 B2
(45) Date of Patent: Nov. 9, 2010

(54) SINGLE CHIP SOLUTION FOR SOLAR-BASED SYSTEMS

(76) Inventor: Shay-Ping Thomas Wang, 1701 Edgewood La., Long Grove, IL (US) 60047

( * ) Notice: Subject to any disclaimer, the term of this patent is extended or adjusted under 35 U.S.C. 154(b) by 260 days.

(21) Appl. No.: 12/033,236

(22) Filed: Feb. 19, 2008

(65) Prior Publication Data
US 2009/0152947 A1    Jun. 18, 2009

Related U.S. Application Data

(60) Provisional application No. 61/014,156, filed on Dec. 17, 2007.

(51) Int. Cl.
*H02J 9/00* (2006.01)
(52) U.S. Cl. .......................... 307/64; 307/65
(58) Field of Classification Search ............... 307/64, 307/65, 64.65
See application file for complete search history.

(56) References Cited

U.S. PATENT DOCUMENTS

| | | | |
|---|---|---|---|
| 4,667,142 | A | 5/1987 | Butler |
| 5,387,858 | A | 2/1995 | Bender et al. |
| 6,384,570 | B2 | 5/2002 | Matsuyama |
| 6,472,846 | B1 | 10/2002 | Hutchinson et al. |
| 6,685,334 | B2 | 2/2004 | Kenny et al. |
| 6,847,130 | B1 | 1/2005 | Belehradek et al. |
| 6,914,411 | B2 | 7/2005 | Couch et al. |
| 6,977,479 | B2 | 12/2005 | Hsu |
| 7,251,509 | B1 | 7/2007 | Wang |
| 7,295,865 | B2 | 11/2007 | Wang |
| 2004/0207366 | A1 * | 10/2004 | Sung .......................... 320/140 |
| 2006/0192435 | A1 * | 8/2006 | Parmley ....................... 307/66 |
| 2007/0052385 | A1 | 3/2007 | Fan |
| 2007/0145952 | A1 * | 6/2007 | Arcena ....................... 320/135 |

FOREIGN PATENT DOCUMENTS

WO    WO 2009018853 A1 *   2/2009

OTHER PUBLICATIONS

Electronic Design, "Maximum-power-point-tracking solar battery charger," http://electronicdesign.com, Sep. 14, 1998.

(Continued)

*Primary Examiner*—Robert L. Deberadinis
(74) *Attorney, Agent, or Firm*—Adam K. Sacharoff; Much Shelist

(57) ABSTRACT

In one embodiment there is provided a power management system for managing the power from solar panels and rechargeable batteries to power a system that includes DC loads and AC loads. The power management system includes a DC-DC converter in communication with the solar panels, a first switch positioned to control power from the DC-DC converter, to and from the rechargeable batteries, and to the DC loads and AC loads, and when in response to a power requirement from the system being equal to or less than a solar panel power provided by the solar panels, the first switch automatically set, by the power management system, to supply the system with only the solar panel power, and wherein any excess solar panel power not consumed by the system is at the same time automatically directed to recharge the rechargeable battery.

17 Claims, 12 Drawing Sheets

OTHER PUBLICATIONS

Maxim Integrated Products, "How to Design Battery Charger Applications that Require External Microcontrollers and Related System-Level Issues," http://www.maxim-ic.com, Mar. 15, 2000.

Texas Instruments, "Single-Chip Charge and System Power-Path Management IC," Aug. 2004 rev. Oct. 2005.

Xuehao Hu, "The Development Prospects of Renewable Energy and Distributed Generation in Power System and The Requirements for Energy Storage Technology," China Electronic Power Research Institute, Oct. 24, 2006.

* cited by examiner

SINGLE CHIP SOLUTION FOR SOLAR-BASED SYSTEMS

CROSS REFERENCE TO RELATED APPLICATIONS

The present application is a Nonprovisional Application of and claims priority to U.S. Provisional 61/014,156.

BACKGROUND OF THE INVENTION

Existing solar-based systems store solar energy in a battery first, and then use the stored energy to generate DC or AC powers. These designs negatively affect the system efficiency, reliability, and availability. Substantial solar power is lost in the battery due to energy storage. The operations of existing systems rely on the integrity of the battery. When the battery degrades, or is disconnected, the system will shut down even if there is plentiful solar energy.

U.S. Pat. Nos. 7,251,509, and 7,295,865 owned by the Applicant, addresses the efficiency, reliability, and availability problems for solar-based systems. The architecture and charge controller that incorporates the patented method and circuit is applied to a solar-based system. The solar energy is used to power the system directly, and then excess energy is used to charge the battery. Therefore, the storage loss in a battery is reduced. Since the solar energy and battery power the system simultaneously, the patented design is more reliable and readily available.

In addition, with sky rocketing oil price, and global warming, it is imperative to use renewable energy such as solar, wind, heat, tide, wave and biomass energy to replace existing oil and carbon-based energy. Existing solar systems comprising multiple equipments are bulky, and expensive. The application of a single chip solution to solar-based systems is herein provided. However, the Patent Applications are readily applicable to systems powered by other renewable energy such as wind, heat, tidal and waves. The integrated circuit approach can greatly reduce system complexity, size, and cost. It is proposed herein to provide a single chip solution that integrates circuits from a charge controller, a DC-to-DC converter, and a DC-to-AC inverter in a single IC, or module.

SUMMARY OF THE INVENTION

In various aspects of the embodiments of the invention there is provided one or more of the following novel concepts. In one embodiment there is provided a power management system for managing the power from solar panels and rechargeable batteries to power a system that includes DC loads and AC loads. The power management system includes a first switch positioned to control power from solar panels to and from the rechargeable batteries, and to the DC loads and AC loads. The system, when in response to a power requirement being equal to or less than a solar panel power provided by the solar panels, the first switch automatically set, by the power management system, to supply the system with only said solar panel power, and wherein any excess solar panel power not consumed by the system is at the same time automatically directed to recharge the rechargeable battery.

In another embodiment there is provided a power management system for managing the power from solar panels and rechargeable batteries to power a system that includes DC loads and AC loads. The power management system includes a first switch positioned to control power from the solar panels, to and from the rechargeable batteries, and from the rechargeable batteries to the DC loads and AC loads; a second switch positioned to control power from the solar panels to the DC loads; and a third switch positioned to control power from the solar panels to the AC loads. When in response to a power requirement from the system being equal to or less than a solar panel power provided by the solar panels, the first switch automatically set, by the power management system, to supply the system with only the solar panel power, and wherein any excess solar panel power not consumed by the system is at the same time automatically directed to recharge the rechargeable battery. In addition, when in response to the DC loads having a higher priority than the AC loads, the second and third switches automatically set, by the power management system, to supply power only to the DC loads, and when in response to the AC loads having a higher priority than the DC loads, the second and third switch automatically set, by the power management system, to supply power only to the AC loads. In addition, the power management system may in response to a power requirement from the system being greater than the solar panel power provided by the solar panels but less then a combined power from solar panel power and the rechargeable battery, set the first switch automatically to supplement the system with power from the rechargeable batteries.

Yet further, the power management system when in response to a power requirement from the system being greater than a combined power from solar panel power and the rechargeable battery, automatically set the second and third switches to reduce the power requirement from the system by turning power off to either the DC loads or the AC loads dependent upon whether the DC loads or the AC loads have a higher priority than the other.

In addition, the power management system may have the third switch positioned to control power from the solar panels to the AC loads and further include a fourth switch positioned to control power from the solar panels to an outside AC power grid. Therefore, when in response to a power requirement from the system being greater than a combined power from solar panel power and the rechargeable battery, said second, third and fourth switches automatically set, by the power management system, to reduce the power requirement from the system by turning power off to either the DC loads, the AC loads, or the AC power grid dependent upon whether the DC loads, the AC loads, or the AC power grid have a higher priority than the other. The higher priority may be set by first turning off the power to the AC power grid, and then turning off power to the DC loads, and then turning off power to the AC loads.

In another embodiment, a power management system is provide for managing the power from renewable power source and rechargeable batteries to power a system that includes DC loads and AC loads. The power management system includes a first switch positioned to control power from the renewable power source; a second switch positioned between the first switch and the rechargeable batteries to control power to and from the rechargeable batteries; a third switch positioned between the first and the DC loads to control power to the DC. loads; and a fourth switch positioned between the first switch and the AC loads to control power to the AC loads. The system when in response to a power requirement from the system being equal to or less than a renewable power provided by the renewable power source, the first, second, third, and fourth switches automatically set, by the power management system, to supply the system with only said renewable power, and wherein any excess renewable power not consumed by the system is at the same time automatically directed to recharge the rechargeable battery. In addition, when in response to a power requirement from the system being greater than a combined power from renewable power source and the rechargeable battery, the third and fourth switches automatically set, by the power management system, to reduce the power requirement from the system by turning power off to either the DC loads or the AC loads dependent upon whether the DC loads or the AC loads have a higher priority than the other.

In another aspect thereof, the power management when in response to the DC loads having a higher priority than the AC loads, the fourth switch automatically turned off and the third switch automatically turned on, by the power management system, such that power is supplied only to the DC loads. Further when in response to the AC loads having a higher priority than the DC loads, the third switch automatically turned off and the fourth switch automatically turned on, by the power management system, such that power is supplied only to the AC loads.

In addition thereto, the power management system may position the fourth switch to control power from the solar panels to the AC loads and further provide a fifth switch positioned to control power from the solar panels to an outside AC power grid. In such a system, the power management system of when in response to a power requirement from the system being greater than a combined power from solar panel power and the rechargeable battery, the third, fourth, and fifth switches automatically set to reduce the power requirement from the system by turning power off to either the DC loads, the AC loads, or the AC power grid dependent upon whether the DC loads, the AC loads, or the AC power grid have a higher priority than the other. The higher priority is set by first turning off the power to the AC power grid, and then turning off power to the DC loads, and then turning off power to the AC loads.

In the embodiments the renewable power source may be provided by solar panels, wind turbines, biomass, or water turbines.

BRIEF DESCRIPTION OF THE DRAWINGS

The accompanying drawings which are incorporated in and form a part of the specification illustrate embodiments of the present invention and, together with the description, serve to explain the principles of the invention. In the drawings.

DETAILED DESCRIPTION OF THE DRAWINGS

Figure 1A:
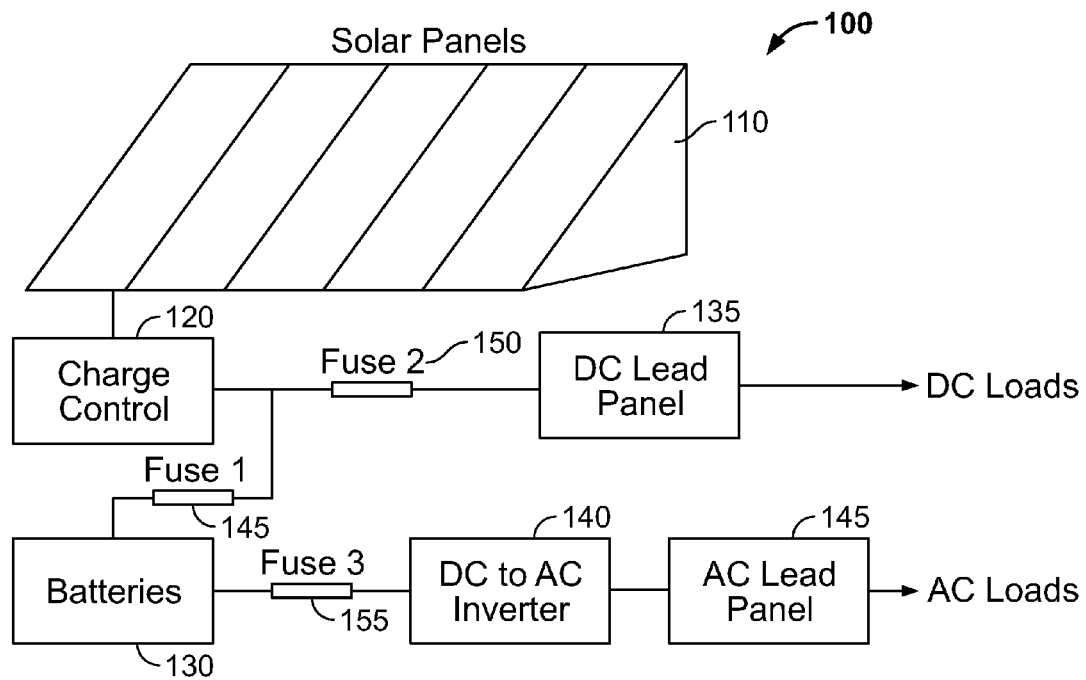
FIG. 1A is a prior art solar panel based system.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the claims by the embodiments illustrated.

Figure 1B:
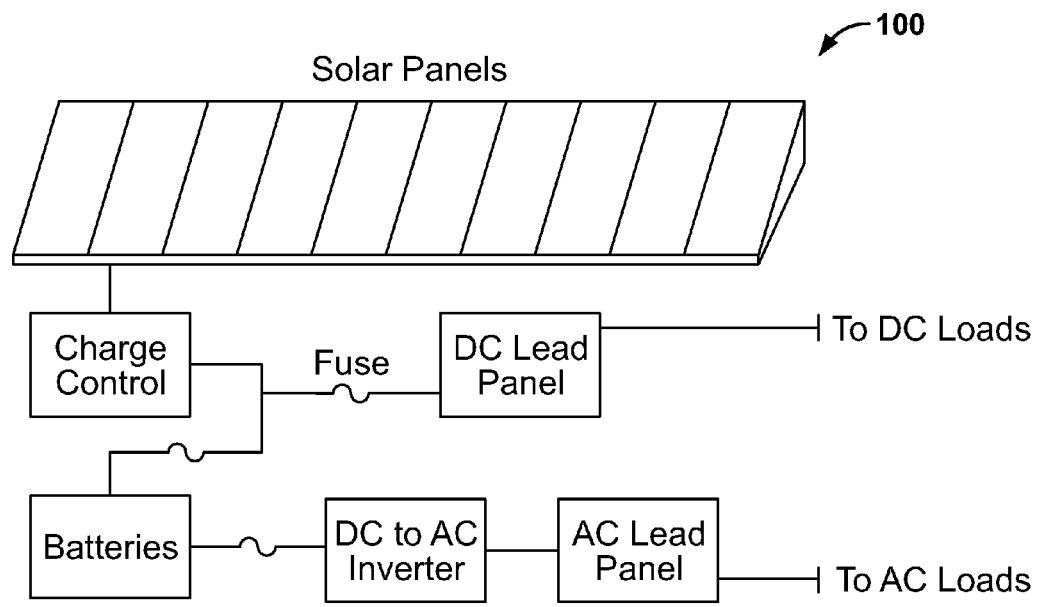
FIG. 1B is a prior art functional block of the solar panel based system of FIG. 1A.

Referring now to prior art FIGS. 1a and 1b, a solar-panel system 100 is illustrated. Solar Panels 110 generate the solar power which is sent to a charge controller 120. The charge controller 120 generates DC voltages and charges the batteries 130. A DC-to-AC inverter 140 is used to convert the DC power to AC. In addition, the batteries 130 are used as the main load or as a backup to the DC lead panel 135 and as the main load to the AC lead panel 140.

The DC or AC powers are outputted through DC or AC Lead Panels 135 and 140, respectively. Three fuses 145, 150, and 155 are used to interconnect the charge controller 120, the DC-to-AC inverter 140, and batteries 130.

In operation, the solar panel system 100 employs the charge controller 120 that uses either Maximum Power Point Tracking (MPPT), or multi-stage charging techniques to charge the batteries 130 via the first fuse 145. The batteries 130 power the DC loads via the first fuse 145 and the second fuse 150. The DC-to-AC inverter 140 is connected to the batteries by the third fuse 155. The DC-to-AC inverter 140 also powers the AC loads through the AC lead panel 145.

This architecture stores solar energy in the batteries 130 first, which adversely affects the systems efficiency, reliability, and availability. The batteries 130 lose substantial stored energy due to leakage. For example, the energy loss is typically 5% for a lithium-ion battery, and 25% for lead-acid battery. The system relies on the integrity of batteries 130. If the batteries 130 degrade (low, depleted, or defective) or are disconnected, the system 100 shuts down completely. Lastly, the system cannot generate power instantly, therefore if the batteries 130 are low, depleted, defective, or disconnected, the system 100 has no power to provide the DC or AC loads.

Figure 2:
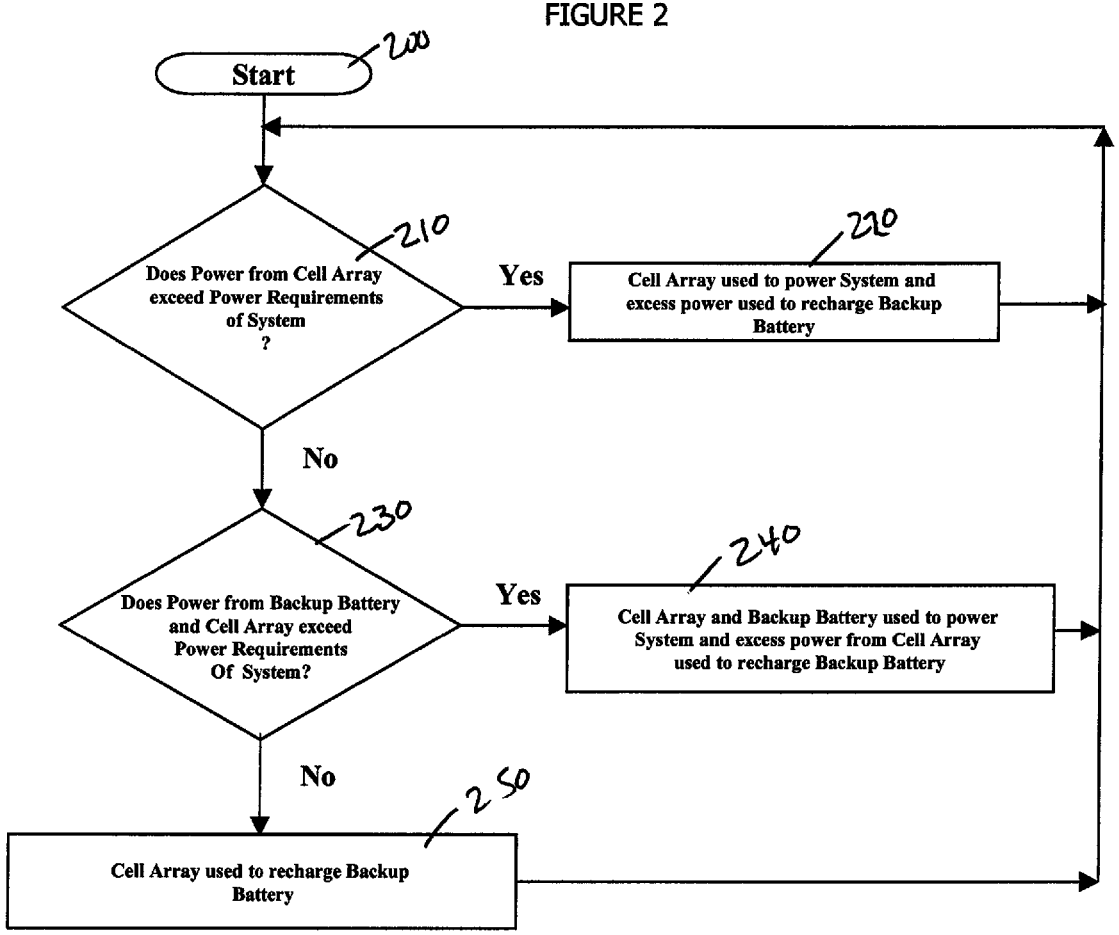
FIG. 2 is a method of operation for a solar panel based system in accordance with an embodiment of the present invention.

To improve upon the prior art system, a new method for the solar-panel system 100 needs to be implemented. As illustrated in FIG. 2, a new method of operation for the solar-panel system 100 is illustrated. The method starts at box 200, and moves to 210 to determine if the power from the solar panel or cell array exceeds the power requirement of the system. If yes, at box 220, the power from the solar panel array is used to power the system and excess power is used to charge the battery. If the solar panel array is insufficient to power the system, the cell array, method moves to box 230. At box 230, the method determines if power from the battery and the solar panel array exceeds the power requirements of the system. If yes, the solar panel array and the battery are used to power the system and any excess power from the solar panel array can be used to recharge the battery, box 240. If the combined power from solar panel array and batteries is lower than the system requirement, the solar panel array is used to charge the battery, box 250.

Figure 3:
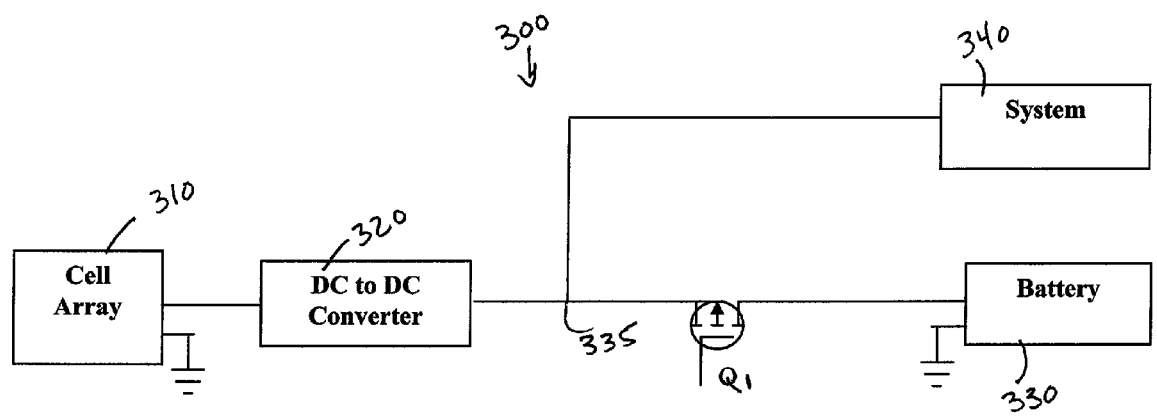
FIG. 3 is an embodiment of a power management system.

Used with the method a power management system 300 as illustrated in FIG. 3 is used for the solar panel (or cell) array. The power management system 300 comprises the solar panel array 310 sending its power to a DC-DC converter 320. A first switch Q1 is placed between the battery 330 and the transmission line from the DC-DC converter 320 and the system 340 branch 335. Utilizing the power management system 300 the solar energy 310 powers the system 340, and uses the excess power to charge the battery 330 via the first switch Q1. If the solar energy 310 starts to weaken, the excess power to charge the battery is also decreased. If the solar energy 310 is insufficient to power the system 340, the battery 330 power supplements the solar power 310 to power the system 340 via the first switch Q1. If the solar energy 310 is completely disrupted, the battery 330 becomes the sole power source to power the system 340 through the first switch Q1.

Embodiments of the power management system are that maximum power point tracking (MPPT) techniques can be used to draw the maximum solar power from the solar panel array. Under constant atmospheric conditions, the Maximum Power Point (MPP) voltage (or current) of the solar panel array remains the same regardless of the system power requirement. The power management system also adjusts the duty ratio of the DC-DC converter to track the MPP voltage (or current). In addition, the power management system powers the system and charges the battery with excess power.

Since the solar energy is used to power the system first, and then the excess energy is used to charge the battery, the storage loss in a battery is kept to a minimum. Hence, the system efficiency is optimized. In addition, since the solar energy and battery power the system simultaneously, the design is robust and readily available.

Figure 4A:
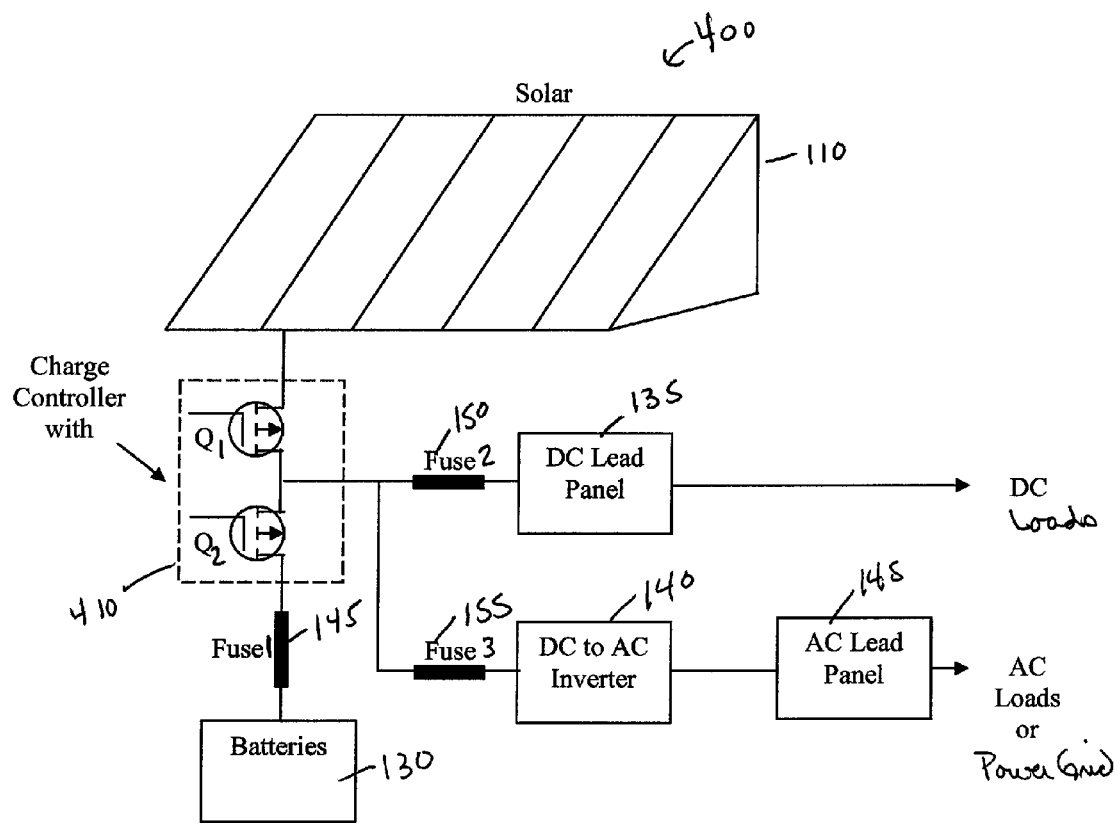
FIG. 4A is a solar-panel based system in accordance with another embodiment of the present invention.

Referring now to FIG. 4a, there is shown one embodiment of an architecture for a charge controller for a solar-panel system 400. The system 400 includes the solar panel 110, the DC and AC lead panels 135, 145 respectively and the DC-AC converter 140 and the battery 130. In addition, the three fuses 145, 150, and 155 are also used. The architecture however includes a charge controller 410 and includes two switches, a first switch Q1 and a second switch Q2. In the system 400, the battery 130 is used as a backup and not as a main load. The operation of the charge controller 410 is as follows:

The solar energy 110 powers the DC loads through the first switch Q1 and the second fuse 150. The solar energy 110 also powers the DC-AC inverter 140 through the first switch Q1 and the third fuse 155. Excess power from the solar energy 110 is used to charge the batteries 130 when both the first switch Q1 and the second switch Q2 are activated, and through the first fuse 145. If the solar energy 110 is declining or interrupted, the batteries 130 supplement the solar energy 110 to power the DC loads through the first fuse 145, and through the second switch Q2 and the second fuse 150. If the solar energy 110 is declining or interrupted, the batteries 130 can supplement the solar energy to power the AC loads through the first fuse 145 and the second switch Q2, and through the third fuse 155.

Figure 4B:
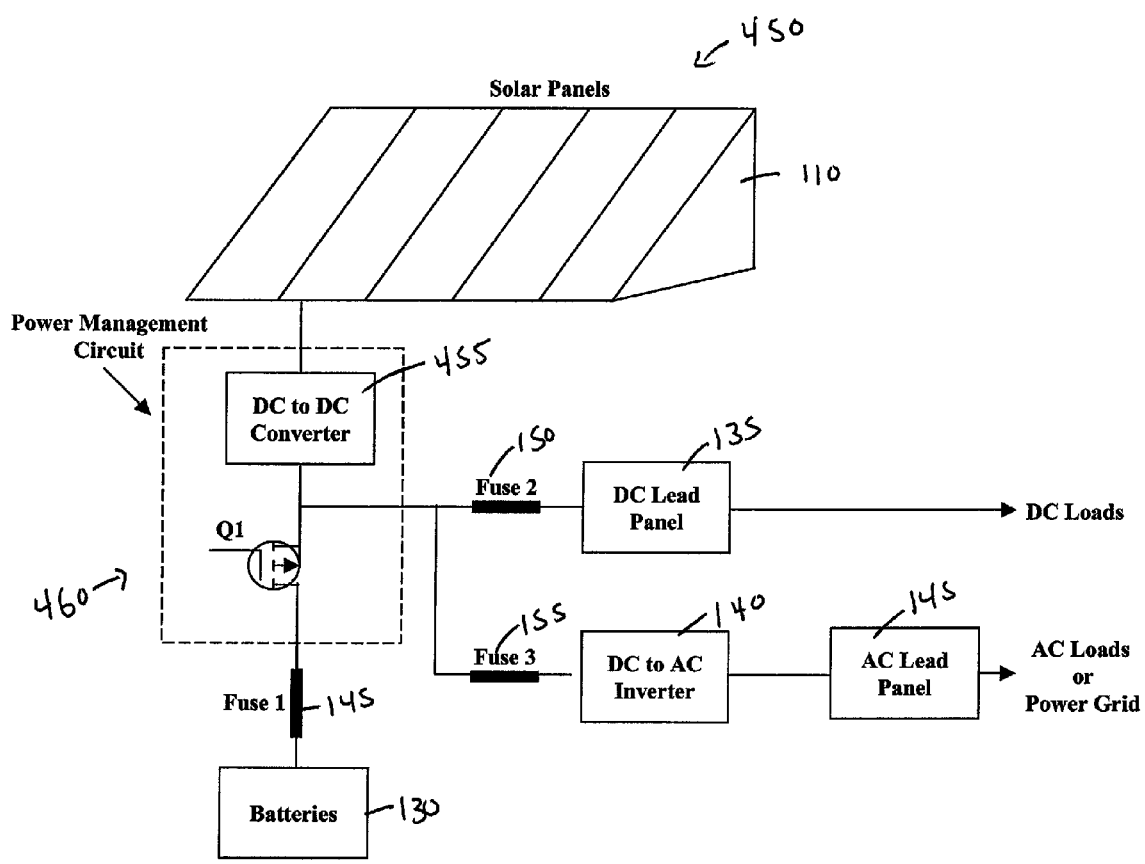
FIG. 4B is a solar-panel based system in accordance with another embodiment of the present invention.

Referring now to FIG. 4b, there is shown another embodiment of an architecture for a power management system for a solar-panel system 450. The architecture and power management system comprise similar functional blocks to FIG. 1, with the differences being the charge controller 460 uses a power management system method and circuit and the batteries 130 are used as backup, not a main load.

The operation of the system 450, follow that the solar energy 110 powers the DC loads via the second fuse 150. The solar energy 110 powers the DC-AC inverter 140 via the third fuse 155. Excess power is used to charge the batteries 130 through the first switch Q1 and the first fuse 145. If the solar energy is declining or interrupted, the batteries 130 supplement the solar power to power the DC loads through the first fuse 145 and the first switch Q1, and through the second fuse 150. If the solar energy 110 is declining or interrupted, the batteries 130 supplement the solar power to power the AC loads via the first fuse 145 and the first switch Q1, and then through the third fuse 155.

Figure 5:
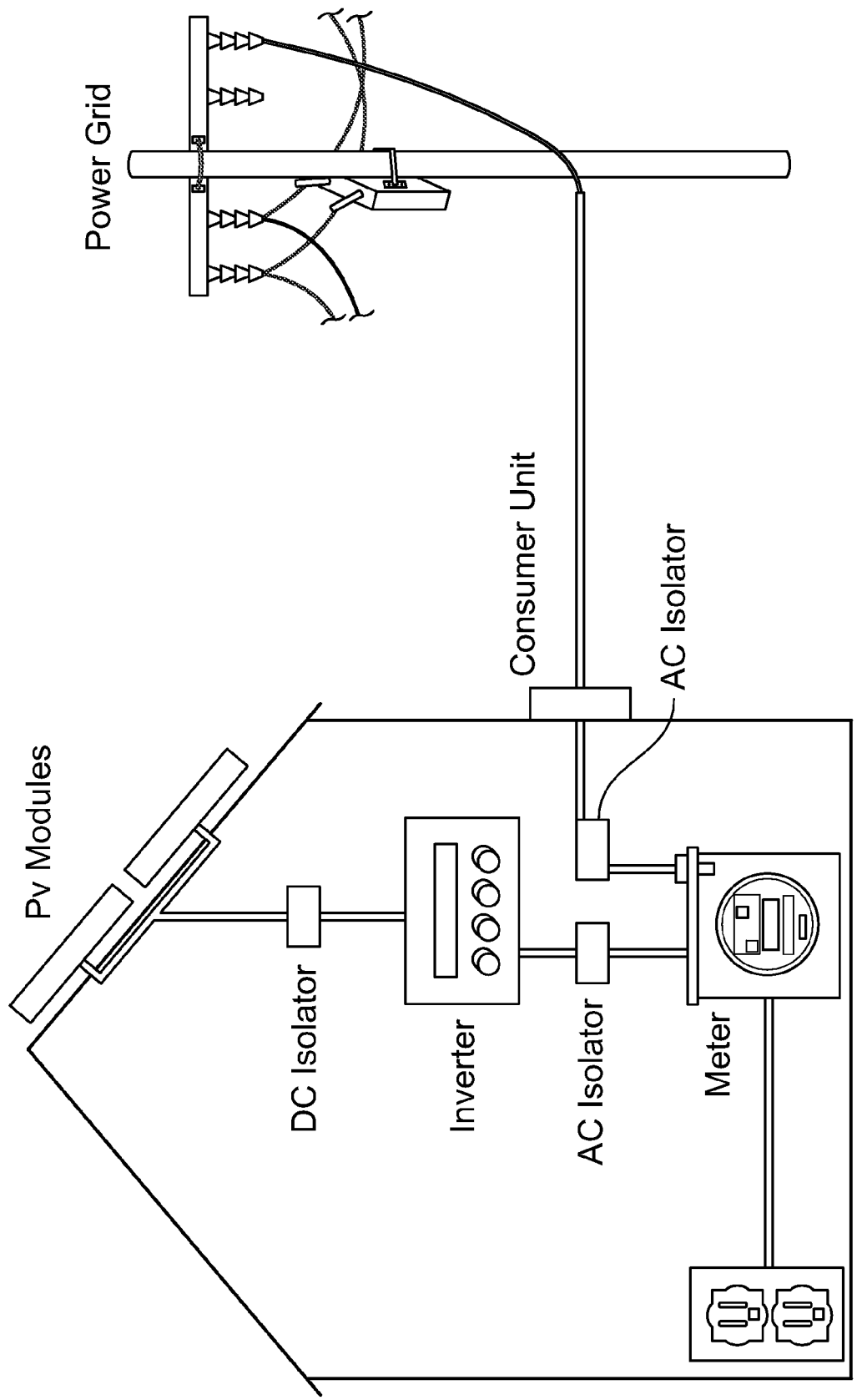
FIG. 5 is a system illustration showing power being connected to a power grid.

To take advantage of free and clean energy, many households are installing solar-based systems. If more electricity is generated from the solar system than what the household needs, the extra electricity can be sold to utility companies. Under the federal law, utility companies must allow the individual power producers to connect to the power grid and purchase the excess electricity. FIG. 5 shows a grid connected solar-based systems. The solar energy generated from the rooftop Photovoltaic (PV) models is converted to AC power first, and then the excess AC power feeds the power grid via the utility meter. Each household may have one or two utility meters.

For one-meter system, the household and utility company use the same meter. The electricity from the power grid turns the meter forward, and the electricity to the power grid will turn the meter backward. Therefore, the meter shows the balance, or net metering. For two-meter system, one meter shows the electricity to the power grid and the other meter shows the electricity from the power grid. Hence, the difference of the two meters shows the balance.

The architecture and charge controller shown in FIGS. 4a and 4b are readily applicable to grid connected solar-based systems, where the AC lead panel is connected to the power grid.

Figure 6A:
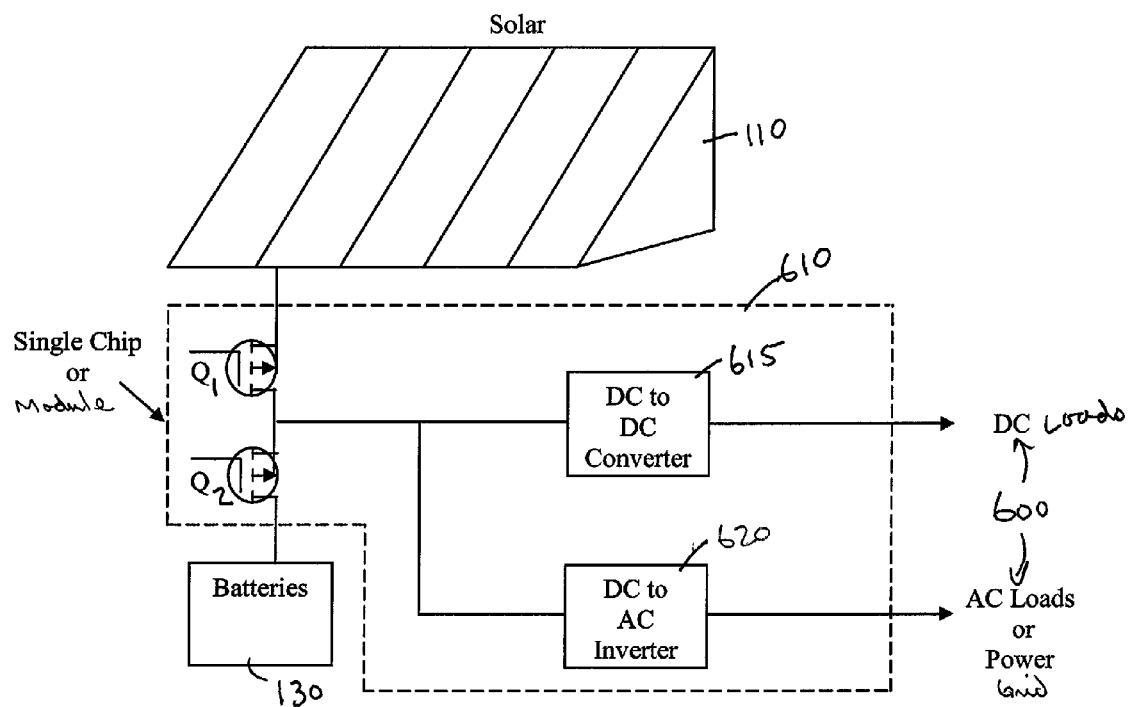
FIG. 6A is a single chip solution for FIG. 4A.
Figure 6B:
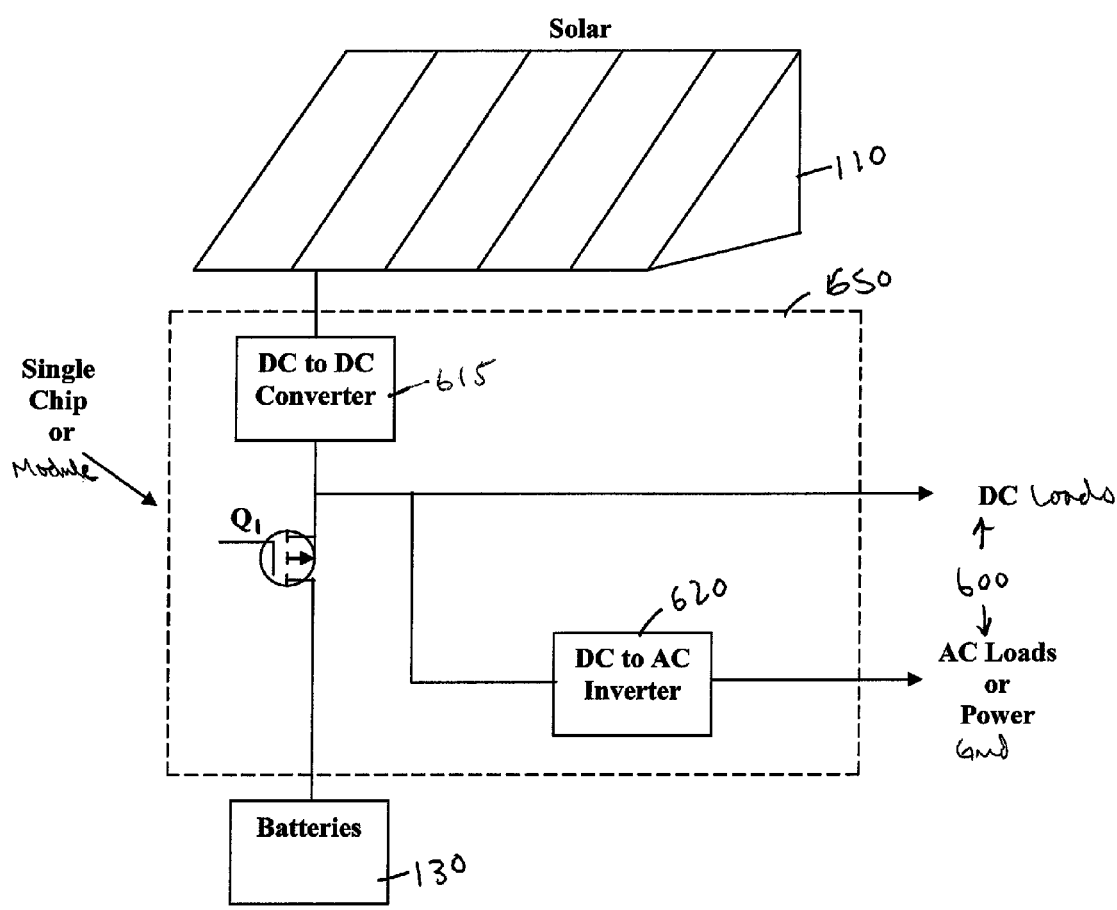
FIG. 6B is a single chip solution for FIG. 4B.

FIGS. 6a and 6b are single chip or module designs of FIGS. 4a and 4b, respectively. Since existing solar-based systems comprise multiple equipments, which are bulky and expensive, a single chip or module design can greatly reduce the system complexity, size, and cost.

FIG. 6a integrates the charge controller circuit, DC-DC converter circuit 615, and DC-AC inverter circuit 620 into a single chip 610, or module for solar-based systems. The operations of single chip solution are described as follows:

all fuses that interconnect the functional blocks are eliminated;

the solar energy 110 powers the system 600 (DC loads, AC loads, or power grid) via a first switch Q1, and excess power from the solar energy 110 is stored in batteries 130 via the first and second switches Q1 and Q2; and if the system 600 requires more power than the solar panel produce, the batteries 130 supplement the solar power to power the system through the second switch Q2.

Similarly, FIG. 6b illustrates the integration of the DC-to-DC converter 615 and DC-AC inverter 620 in a single power management chip 650 or module for solar-based systems. The operations of the single chip solution in FIG. 6b are described as follows:

All fuses that interconnect the functional blocks are eliminated;

the solar energy 110 powers the system 600 (DC loads, AC loads, or power grid), and excess power is stored in batteries 130 through the first switch Q1;

if the system 600 requires more power than the solar panels 110 provides, the batteries 130 supplement the solar energy 110 to power the system 600 through the first switch Q1.

It may be desirable to control the flow of power to DC loads, AC loads, or power grid individually. This can be achieved by adding two switches in the circuit schematics of FIGS. 6a and 6b to create the schematics of FIGS. 7a and 7b, respectively.

Figure 7A:
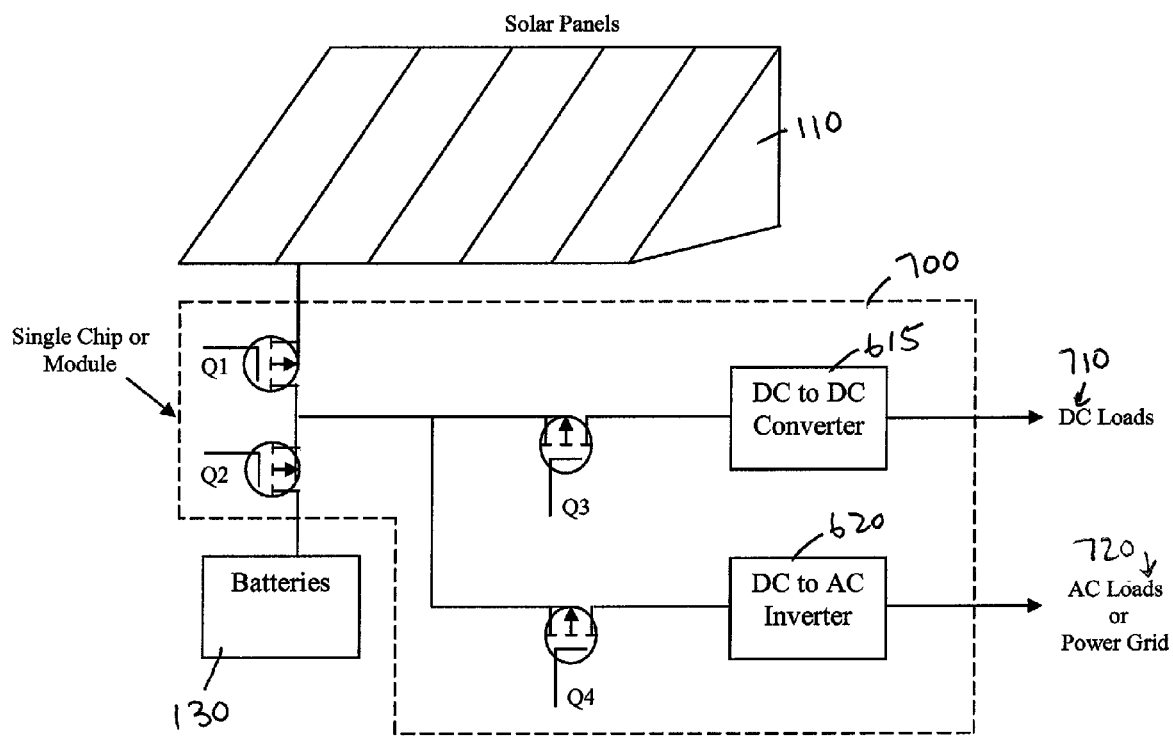
FIG. 7A is an alternative solution for a single chip solution for FIG. 4A.

Referring now to FIG. 7a, the operations of the single chip circuit schematic 700 are described below:

if the DC loads 710 has higher priority, the third switch Q3 is turned on, and the fourth switch Q4 is turned off, cutting power to the AC loads or power grid 720; the solar energy 110 powers the DC loads 710 through the first switch Q1 and the third switch Q3; and the batteries 130 can power the DC loads through the second switch Q2 and through third switch Q3;

if the AC loads or power grid 720 has a higher priority, the third switch Q3 is turn off and the fourth switch Q4 is turned on; the solar energy 110 then powers the AC loads 720 through the first switch Q1 and the fourth switch Q4; and the batteries 130 power the AC loads 720 through the second switch Q2 and the fourth switch Q4; and/or if there is excess power from the solar panels then the loads 710 and 720 require, excess solar power can be used to recharge the batteries 130.

Figure 7B:
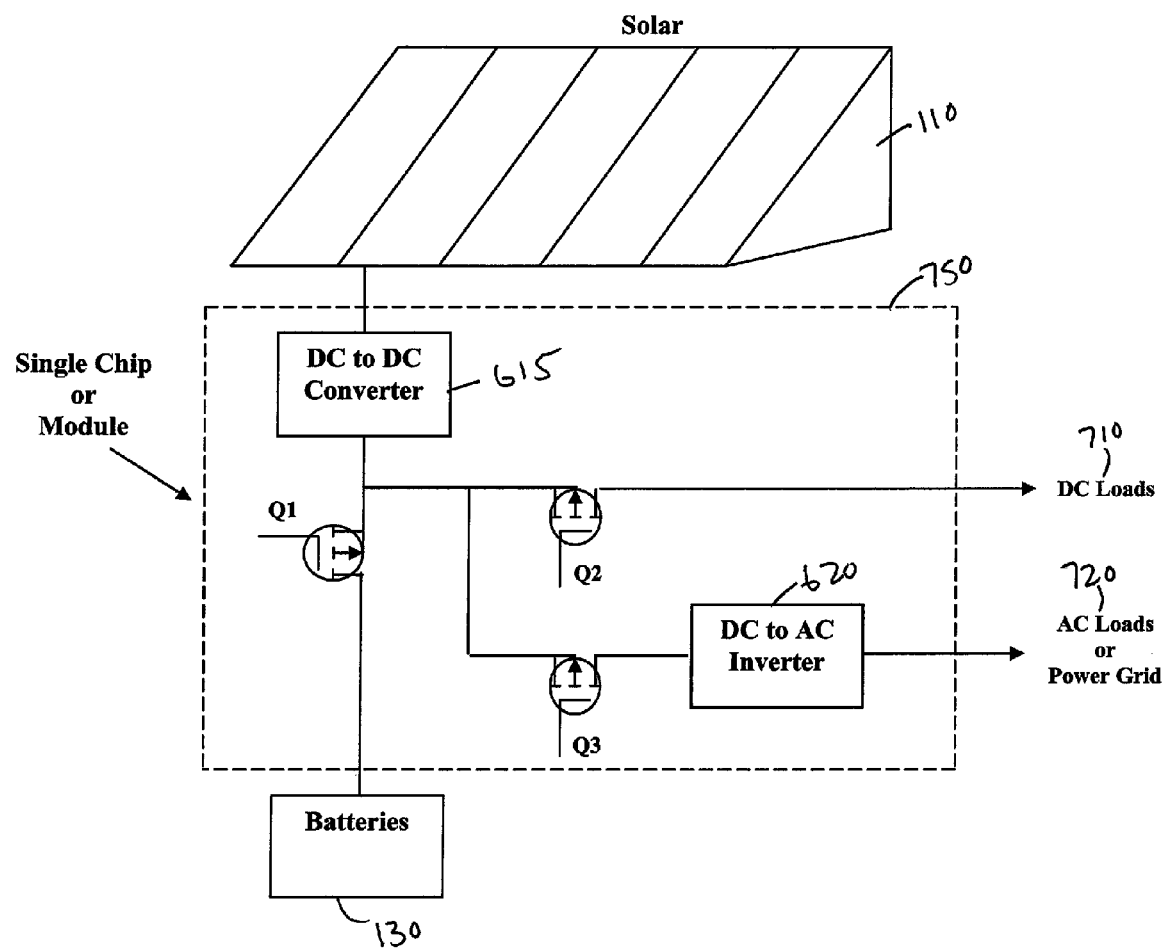
FIG. 7B is an alternative solution for a single chip solution for FIG. 4B.

Referring now to FIG. 7b, if the schematic shown in FIG. 6b requires the control of power to the DC loads, or AC loads or power grid, this can be achieved by adding two more switches (Q2 and Q3) in the circuit schematic to FIG. 6b.

The operations of the single chip circuit schematic 750 are described below:

if the DC loads 710 has higher priority, the second switch Q2 is turned on, and the third switch Q3 is turned off; the solar energy powers the DC loads 710 via the second switch Q2; and the batteries 130 power the DC loads 710 via the first switch Q1 and the second switch Q2;

if the AC loads or power grid 720 has a higher priority, the second switch Q2 is turn off and the third switch Q3 is turned on; the solar energy powers the AC loads 720 via the third switch Q3; and the batteries 130 power the AC loads 720 via the first switch Q1 and the third switch Q3.

Figure 8A:
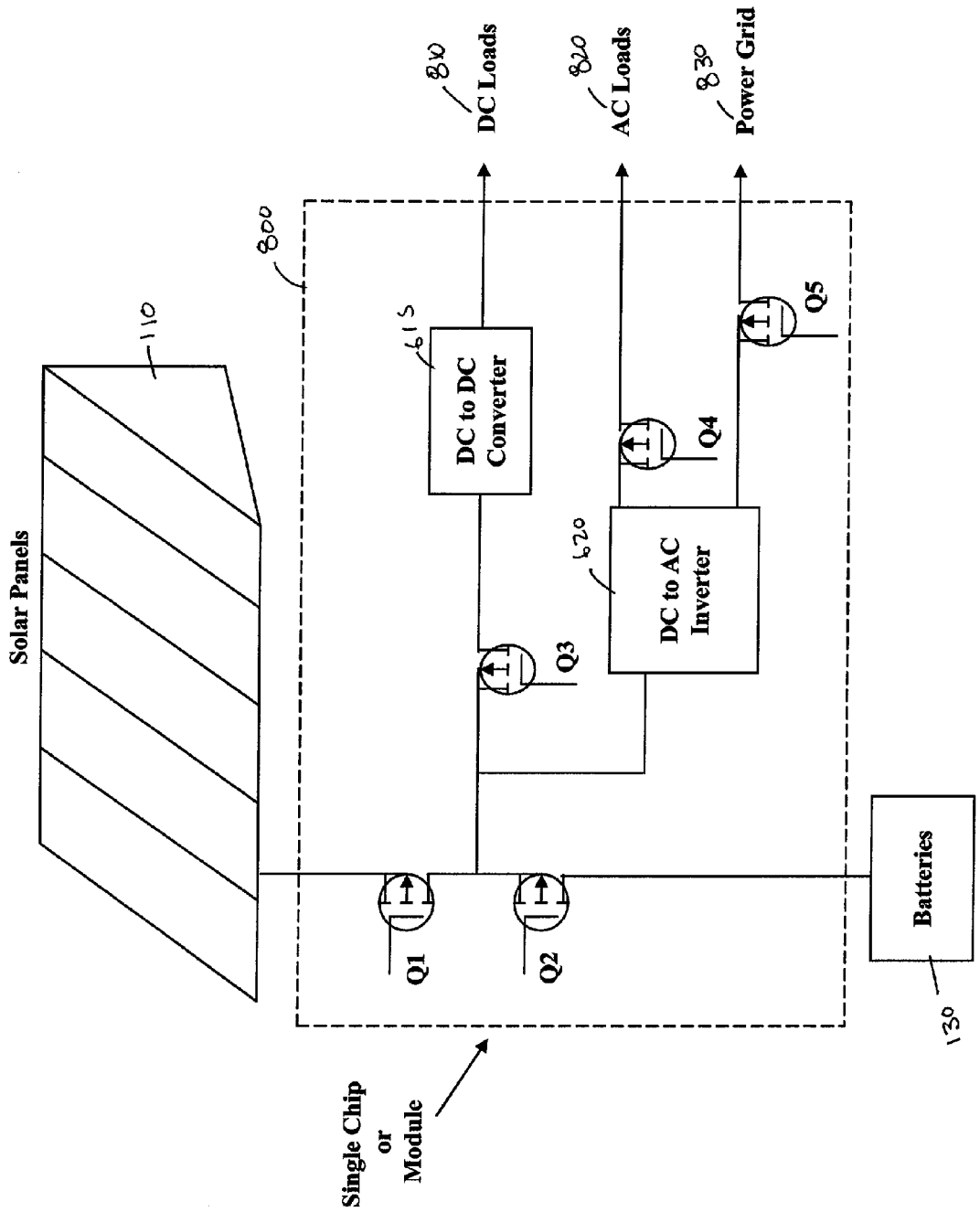
FIG. 8A is an alternative solution for a single chip solution for FIG. 4A.

Referring now to FIG. 8a, in an another embodiment, the operations of the single chip circuit schematic 800 are described below:

in normal circumstances the system can direct the power from the solar panels 110 to both the system loads and the batteries 130 by turning on the first switch Q1 and the second switch Q2; such normal circumstances may exist when the system loads require less then the power produced or emitting from the solar panels 110 and the batteries 130;

if the system loads require more then what is available from the solar panels 110 and the batteries 130, the circuit 800 can direct the power to certain loads by switching off some of the loads based on priorities:

the system 800 can first shut off the loads to the power grid 830 by turning off the fifth switch; if the system loads are still higher then the output from the solar panels 110 and the batteries 130, the system 800 can then shut off the DC loads 810 by turning off the third switch Q3; the final shut off of the AC loads 820 by turning off the fourth switch Q4 can be done if the solar panels 110 and the batteries are not producing enough power, this may occur when the batteries need to be recharged and it is desired to recharge the batteries quickly without bleeding off power to the system loads.

In addition, it is also possible to turn off the switches to the power loads in accordance with various priorities or circumstances determined by the user.

Figure 8B:
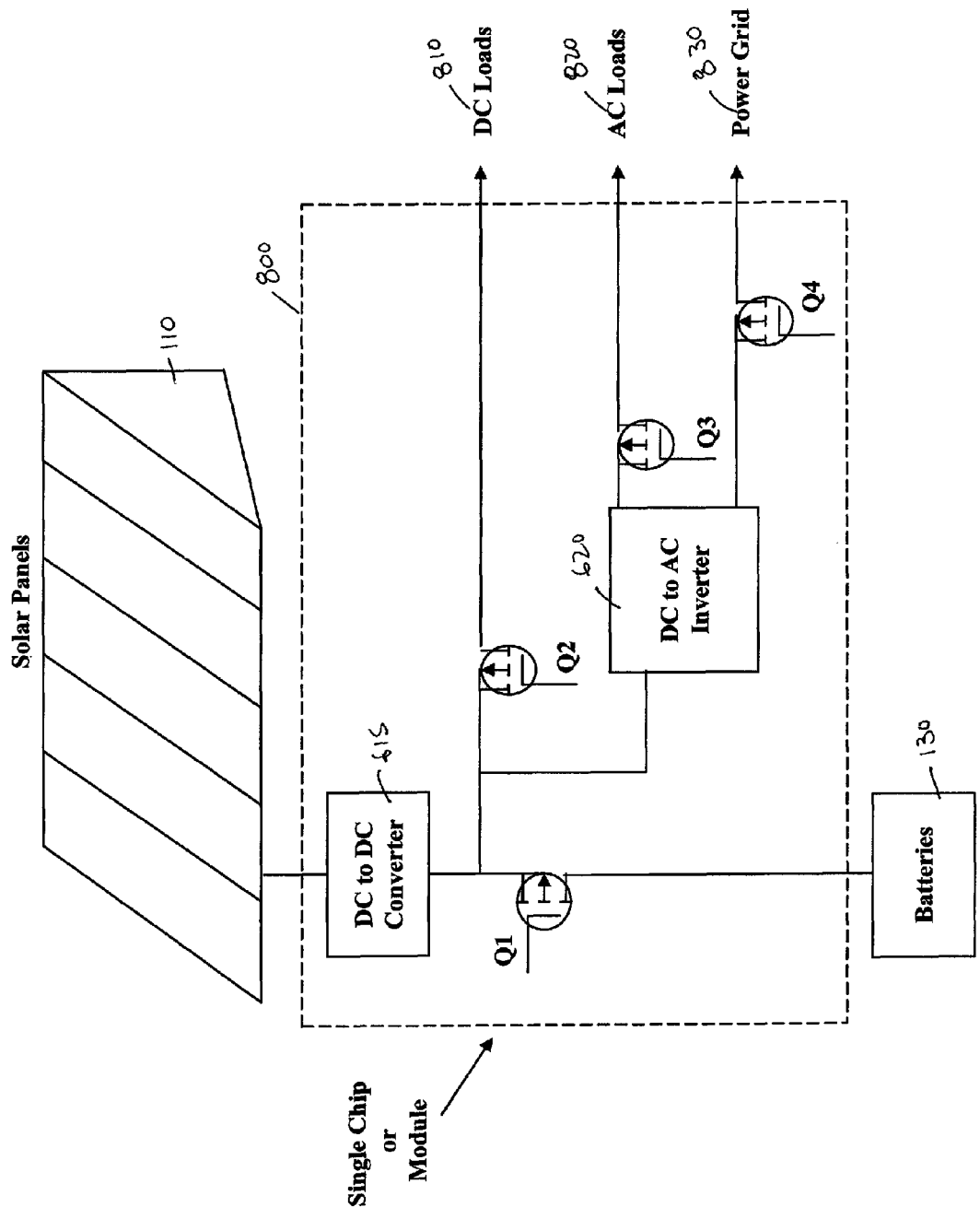
FIG. 8B is an alternative solution for a single chip solution for FIG. 4B.

Referring now to FIG. 8b, the system includes four switches used to turn on and off the power to various loads and to the batteries.

As discussed herein the rechargeable batteries used by the systems may include any type of energy storage device such as but not limited to a super capacitor.

As utilized herein the reference to a DC load to the system can generally refer to an outlet that allows a device that runs off of or needs to be recharged by DC power. The DC outlet could be a USB, PoE, or others, which not only provide a DC source but could also provide communication means among devices. As is well known in the art such DC devices may include battery chargers for handheld devices, USB powered devices, PoE (power over ethernet) devices; VoIP (voice over internet protocol) devices; wireless LAN access points; bluetooth access points; web cameras; smart signs/web signs; vending machines; gaming machines; audio and video machines; retail point of information or sale systems; EPOS (electronic point of sales) systems; building access control systems; electronic devices; smoke detectors; utility systems and appliances.

As explained and detailed above, priorities of the system in determining when to turn off power loads would be determined based on if the power requirements are greater then the power produced and provided by the solar panels and batteries. In most circumstances, the AC loads to a power grid will be turned off first, followed by turning off the loads to the DC loads. Final shut down would be to turn off the AC loads such that all power from the solar panels can be directed to recharge the batteries. However, it is possible to let a user make the priorities.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover all such modifications.

I claim:

1. A power management system for managing the power from solar panels and rechargeable batteries to power a system that includes DC loads and AC loads, the power management system comprising;

an only single primary switch positioned to control power from the solar panels, to and from the rechargeable batteries, and to the DC loads and AC loads, and when in response to a power requirement from the system being equal to or less than a solar panel power provided by the solar panels, said first switch automatically set, by the power management system, to supply the system with only said solar panel power, and wherein any excess solar panel power not consumed by the system is at the same time automatically directed to recharge the rechargeable battery.

2. The system of claim 1, wherein said power management system further includes a DC-AC inverter between the only single primary switch and the AC loads, such that the DC-AC inverter is connected to both the rechargeable batteries and the solar panels.

3. A power management system for managing the power from solar panels and rechargeable batteries to power a system that includes DC loads and AC loads, the power management system comprising:

a first switch positioned to control power from the solar panels, to and from the rechargeable batteries, and from the rechargeable batteries to the DC loads and AC loads;

a second switch positioned to control power from the solar panels to the DC loads; and a third switch positioned to control power from the solar panels to the AC loads, when in response to a power requirement from the system being equal to or less than a solar panel power provided by the solar panels, said first switch automatically set, by the power management system, to supply the system with only said solar panel power, and wherein any excess solar panel power not consumed by the system is at the same time automatically directed to recharge the rechargeable battery, and when in response to the DC loads having a higher priority than the AC loads, said second and third switches automatically set, by the power management system, to supply power only to the DC loads, and when in response to the AC loads having a higher priority than the DC loads, said second and third switch automatically set, by the power management system, to supply power only to the AC loads.

4. The power management system of claim 3, when in response to a power requirement from the system being greater than the solar panel power provided by the solar panels but less then a combined power from solar panel power and the rechargeable battery, said first switch automatically set, by the power management system, to supplement the system with power from the rechargeable batteries.

5. The power management system of claim 4, when the AC loads includes a power grid load.

6. The power management system of claim 3 further comprising when in response to a power requirement from the system being greater than a combined power from-solar panel power and the rechargeable battery, said second and third switches automatically set, by the power management system, to reduce the power requirement from the system by turning power off to either the DC loads or the AC loads dependant upon whether the DC loads or the AC loads have a higher priority than the other.

7. The power management system of claim 3, wherein the third switch is positioned to control power from the solar panels to the AC loads and a fourth switch is positioned to control power from the solar panels to an outside AC power grid.

8. The power management system of claim 7 further comprising when in response to a power requirement from the system being greater than a combined power from solar panel power and the rechargeable battery, said second, third and fourth switches automatically set, by the power management system, to reduce the power requirement from the system by turning power off to either the DC loads, the AC loads, or the AC power grid dependant upon whether the DC loads, the AC loads, or the AC power grid have a higher priority than the other.

9. The power management system of claim 8, wherein the higher priority is set by first turning off the power to the AC power grid, and then turning off power to the DC loads, and then turning off power to the AC loads.

10. A power management system for managing the power from renewable power source and rechargeable batteries to power a system that includes DC loads and AC loads, the power management system comprising:
    a first switch positioned to control power from the renewable power source;
    a second switch positioned between the first switch and the rechargeable batteries to control power to and from the rechargeable batteries;
    a third switch positioned between the first and the DC loads to control power to the DC loads; and
    a fourth switch positioned between the first switch and the AC loads to control power to the AC loads,
    when in response to a power requirement from the system being equal to or less than a renewable power provided by the renewable power source, said first, second, third, and fourth switches automatically set, by the power management system, to supply the system with only said renewable power, and wherein any excess renewable power not consumed by the system is at the same time automatically directed to recharge the rechargeable battery, and
    when in response to a power requirement from the system being greater than a combined power from renewable power source and the rechargeable battery, said third and fourth switches automatically set, by the power management system, to reduce the power requirement from the system by turning power off to either the DC loads or the AC loads dependant upon whether the DC loads or the AC loads have a higher priority than the other.

11. The power management system of claim 10, wherein when in response to the DC loads having a higher priority than the AC loads, said fourth switch automatically turned off and said third switch automatically turned on, by the power management system, such that power is supplied only to the DC loads, and when in response to the AC loads having a higher priority than the DC loads, said third switch automatically turned off and said fourth switch automatically turned on, by the power management system, such that power is supplied only to the AC loads.

12. The power management system of claim 10, wherein renewable power source are provided by solar panels.

13. The power management system of claim 10, wherein renewable power source is provided by solar panels, wind turbines, biomass, or water turbines.

14. The power management system of claim 10, wherein the fourth switch is positioned to control power from the solar panels to the AC loads and a fifth switch is positioned to control power from the solar panels to an outside AC power grid.

15. The power management system of claim 14 further comprising when in response to a power requirement from the system being greater than a combined power from solar panel power and the rechargeable battery, said third, fourth, and fifth switches automatically set, by the power management system, to reduce the power requirement from the system by turning power off to either the DC loads, the AC loads, or the AC power grid dependant upon whether the DC loads, the AC loads, or the AC power grid have a higher priority than the other.

16. The power management system of claim 15, wherein the higher priority is set by first turning off the power to the AC power grid, and then turning off power to the DC loads, and then turning off power to the AC loads.

17. The power management system of claim 2, wherein the rechargeable batteries comprise an energy storage device such as a super capacitor.

* * * * *